Nov. 24, 1931.   A. F. NELSON   1,833,091
POWER BELT
Filed Aug. 2, 1923
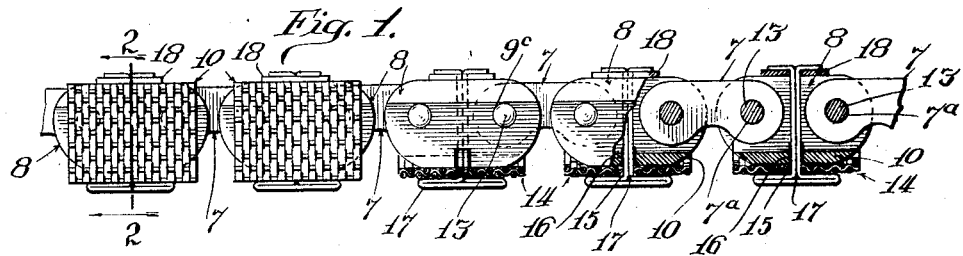
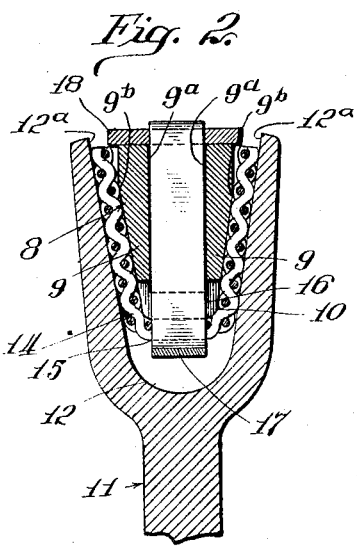
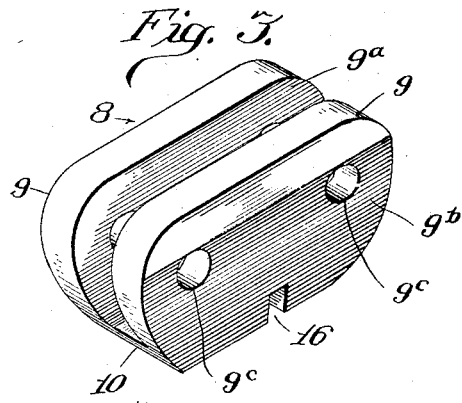
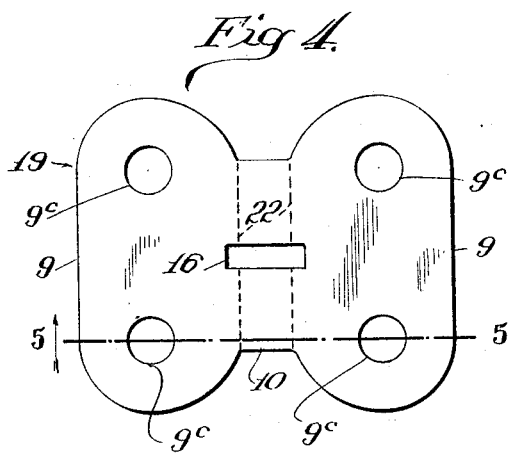
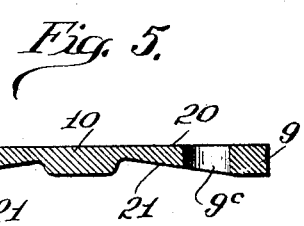

Patented Nov. 24, 1931

1,833,091

UNITED STATES PATENT OFFICE

ARTHUR F. NELSON, OF CHICAGO, ILLINOIS

POWER BELT

Application filed August 2, 1923. Serial No. 655,176.

My invention relates in general to power belts for transmitting power from one machine element to another and more particularly to belts intended for use in connection with light machinery such as the fans of automobiles and the like.

One object of my invention is the provision of a belt which will be strong, durable, quiet running and efficient in operation, and at the same time sufficiently flexible to permit it to be used on pulleys of small diameter mounted closely together, the belt being adapted to run at high speed without danger of heating or sticking in the pulleys.

A further object of my invention is to provide a power belt which will be so shaped as to fit accurately the grooves of curved or V-shaped pulleys, and, preferably, without the necessity of machining the parts.

Another object of the invention is to provide a power belt consisting of a small number of parts of simple construction and which may be readily assembled with a minimum amount of labor, thereby reducing the initial cost of manufacture and facilitating repairs.

The invention consists in the novel constructions, arrangements and devices to be hereinafter described and claimed for carrying out the above stated objects and such other objects as will appear from the following specification; and it consists further in the improved method of making link members for a power belt to be hereinafter described and claimed.

The invention is illustrated in a certain preferred embodiment illustrated in the accompanying drawings wherein—

Fig. 1 is a side elevational view of a power belt embodying the principles of my invention, certain portions thereof being broken away to show the internal construction;

Fig. 2 is a sectional view, on an enlarged scale, taken on the line 2—2 of Fig. 1 and showing also a cross sectional view of a portion of the pulley with which my improved chain is adapted to work;

Fig. 3 is a perspective view, also on an enlarged scale, of one of the link members for the belt;

Fig. 4 is a plan view of one of the blanks from which the link members of the belt are formed; and Fig. 5 is a sectional view taken on the line 5—5 of Fig. 4.

Like characters of reference designate like parts in the several views.

The belt comprises a plurality of links 7 and a plurality of link members, designated generally by the reference character 8, which are alternately arranged and pivotally connected as shown in Fig. 1.

The link members 8 are best shown in Figs. 2 and 3. Each member comprises side portions 9 which are connected by a bottom portion 10. The inner adjacent faces 9a of the side portions 9 are flat and are substantially uniformly spaced throughout their length. The outer faces 9b of the side portions 9 are formed or shaped to conform generally with the contour of the groove of the pulley in which the belt is intended to run. In the embodiment herein illustrated, the belt is shown in Fig. 2 as operating on a pulley 11 having a groove 12, the sides 12a of which are flat and are arranged in substantially V-shaped formation; therefore, the outer faces 9b of the side portions 9 of the link members are flat and are inclined similarly to the inclination of the pulley surfaces 12a.

The side portions 9 of the link members are adapted to embrace the adjacent ends of a pair of the links 7, the ends of the links 7 being provided with perforations 7a and the side portions 9 of the link members being provided with aligned perforations 9c so that pivot pins 13 may be inserted therethrough to connect the links 7 and the link members 8. The ends of the side portions 9 of the link members are rounded so as to avoid interference of the link members when the belt is operated over pulleys of relatively small diameters.

The link members 8 are preferably provided with individual friction strips 14 of any suitable material, for example, woven asbestos fabric, said friction strips being preferably applied to the respective link members so that they extend around the bottom portions of the link members and cover the outer sides 9b of the link member side portions. The friction strips may be secured to the link members 8 in any suitable manner, but they are preferably riveted thereto. To this end the respective friction strips are provided with apertures 15 and the bottom portions 10 of the respective link members are provided with apertures 16 through which the shank of a rivet 17 extends, the under sides of the rivet heads bearing against the outer sides of the friction strips. The plain end of the rivet is passed through a washer 18, adapted to rest on the top edges of the side portions 9, and then the extremities of the rivet are upset over the washer.

The links 7 are preferably stamped from standard stock of the desired thickness, the apertures 7a being punched out. The link members 8 may be inexpensively made from blanks 19 cut from a strip of material rolled or surfaced so that, preferably, it is of the cross section shown in Fig. 5. It will be noted that the blanks have a flat surface 20 on one side. On the other side, each side portion of the blank has a surface adapted to fit the side surfaces of the pulley groove in which the belt operates. In the embodiment herein shown, the side of the blank opposite that having the flat surface 20 has two longitudinally extending surfaces 21 which are inclined downwardly from the outer longitudinal edges toward each other. The blank is punched to provide the apertures 9c in the ends of the side portions and the aperture 16 in the bottom portion 10 for the shank of the rivet. The side portions 9 are bent along the respective dotted lines 22 in a manner to bring the flat surfaces thereof toward each other and into substantially evenly spaced relation, as clearly shown in Figs. 2 and 3. The bottom portion 10 is of a substantial thickness and the side portions 9 of the link members may be treated in any suitable manner to make them sufficiently rigid to provide free movement of the members 7 on their pivot pins notwithstanding the pinching action of the pulley grooves.

The initial cost of manufacturing a belt embodying the principles of my invention is exceedingly low because no machining of the parts is necessary; and, since the parts are few in number, the labor of assembling them is reduced to a minimum. The belt may be operated at high speeds with no appreciable slippage. The construction is such that the air may pass freely around the several parts and hence the temperature of the parts, even when the belt is driven at a high speed, is kept relatively low. The belt is quiet in operation. The belt is not affected by water or oil. Should the friction strips wear to any appreciable extent, they may be readily replaced. If any of the links or link members break or wear sufficiently to require replacement, the worn part may be readily removed and a new part inserted. It will be observed, therefore, that the cost of maintenance is very low.

I do not intend to limit my invention to the details of construction shown and described, except only in so far as certain of the appended claims are specifically so limited, as it will be obvious that modifications may be made without departing from the principles of my invention.

I claim:

1. In combination a plurality of links and members alternately arranged and pivotally connected to form a power belt, each of said members being formed of metal and comprising side portions integrally connected by a bottom portion, the inner faces of said side portions bearing against the respective sides of the two adjacent links, the outer faces of said side portions being shaped so as to conform substantially to the grooves of the pulleys in which the belt is intended to operate, individual friction strips for each of said members, said friction strips extending over the bottom and covering the outer faces of the side portions of said members, and means for securing said friction strips to said members.

2. A power belt comprising a plurality of metal link members in the form of channels, a plurality of other links alternately arranged with said first named channel members, the inner faces of the sides of each said channel member bearing against the respective sides of the second named adjacent links and the outer faces of the sides of each said channel member conforming substantially to the grooves of the pulleys in which the belt is intended to operate, pins loosely mounted in aligned openings through said links and the sides of the channel members for pivotally connecting the parts in the form of a chain, and friction strips secured on said channel members respectively covering the ends of said pins and serving as the bearings for the links on a pulley and also serving to prevent displacement of the pivot pins.

3. A power belt comprising a plurality of metal link members in the form of channels the side wall portions of which are tapered toward the webs, a plurality of other links alternately arranged with said first named channel members, the inner faces of the sides of each said channel member bearing against the respective sides of the second named adjacent links and the outer faces of the sides of each said channel member conforming substantially to the angle of the groove of the pulley in which the belt is intended to operate, and pins mounted in aligned openings through the side portions of the first named link members and through the second named links for pivotally connecting the parts in the form of a chain, said link members being formed of metal of such thickness and strength as to provide heavy bearings for said pins and as to resist strongly any tendency of the side wall portions to bend in use toward or from each other.

ARTHUR F. NELSON.